(12) United States Patent
Huang

(10) Patent No.: US 7,624,435 B1
(45) Date of Patent: Nov. 24, 2009

(54) METHOD AND APPARATUS FOR MANAGING DIGITAL ASSETS

(75) Inventor: Chitai Kenny Huang, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 581 days.

(21) Appl. No.: 10/899,323

(22) Filed: Jul. 26, 2004

(51) Int. Cl.
*H04L 9/32* (2006.01)
*G06F 7/04* (2006.01)

(52) U.S. Cl. .............................. 726/12; 726/1; 713/154

(58) Field of Classification Search .................. 726/1, 726/2, 3, 11, 12, 15, 26, 27
See application file for complete search history.

(56) References Cited

U.S. PATENT DOCUMENTS

| | | | | |
|---|---|---|---|---|
| 5,629,980 | A * | 5/1997 | Stefik et al. ..................... 705/54 |
| 5,781,550 | A * | 7/1998 | Templin et al. ............. 370/401 |
| 5,884,025 | A * | 3/1999 | Baehr et al. ..................... 726/13 |
| 6,606,744 | B1 | 8/2003 | Mikurak |
| 6,629,081 | B1 | 9/2003 | Cornelius et al. |
| 6,671,818 | B1 | 12/2003 | Mikurak |
| 6,963,973 | B2 | 11/2005 | Chapman et al. |
| 7,042,470 | B2 | 5/2006 | Rhoads et al. |
| 7,127,741 | B2 * | 10/2006 | Bandini et al. ................. 726/14 |
| 7,131,141 | B1 * | 10/2006 | Blewett et al. ................. 726/12 |
| 7,152,046 | B2 * | 12/2006 | Wang et al. ................... 705/51 |
| 7,298,864 | B2 * | 11/2007 | Jones .......................... 382/100 |
| 2002/0033844 | A1 * | 3/2002 | Levy et al. ................... 345/744 |
| 2003/0005331 | A1 * | 1/2003 | Williams .................... 713/201 |
| 2003/0065944 | A1 * | 4/2003 | Mao et al. .................... 713/201 |
| 2004/0064537 | A1 * | 4/2004 | Anderson et al. ........... 709/223 |
| 2004/0068543 | A1 * | 4/2004 | Seifert ........................ 709/206 |
| 2005/0138353 | A1 * | 6/2005 | Spies et al. ................. 713/153 |
| 2007/0260872 | A1 * | 11/2007 | Filipi-Martin et al. ....... 713/153 |

* cited by examiner

*Primary Examiner*—Nasser G Moazzami
*Assistant Examiner*—Fatoumata Traore
(74) *Attorney, Agent, or Firm*—Okamoto & Benedicto LLP

(57) ABSTRACT

In one embodiment, a technique for managing an electronic data representation includes storing first and second attributes in response to the creation of the electronic data representation by a user. The electronic data representation may be any type of digital asset, for example. The first and second attributes may be accessed in response to a message including the digital asset being sent by another or the same user. The message may be allowed to pass from a first domain (e.g., a trusted domain) to a second domain (e.g., an open domain) or the message may be maintained in the first domain in response to the first and second attributes. The first attributes may be an asset signature including an identifier and a digital watermark, for example. The second attributes may be an asset policy including distribution lists for sending and/or receiving the message, a content appropriate for sending field, and a time frame for message sending, for example.

28 Claims, 5 Drawing Sheets

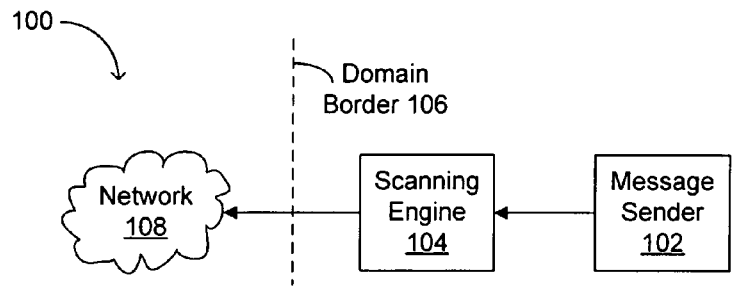
FIG. 1
(conventional)
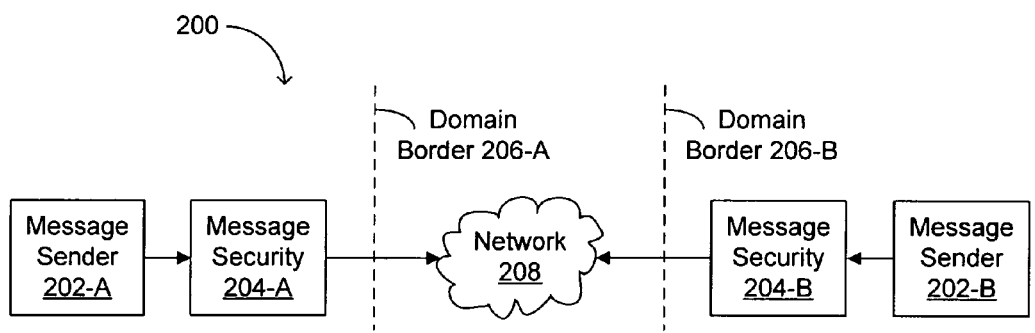
FIG. 2
(conventional)

METHOD AND APPARATUS FOR MANAGING DIGITAL ASSETS

BACKGROUND OF THE INVENTION

1. Field of the Invention

The present invention relates generally to computer systems, and more particularly but not exclusively to digital asset management.

2. Description of the Background Art

As is well known, computers belonging to or interfacing with a computer network may send data to one another. Such data may be in the form of messages, such as e-mail via the Internet. While e-mail facilitates communication, such data transferring is not conducive to protecting digital assets within an organization. For example, intellectual property can be in the form of an electronic document and may include company trade secret information. If an unauthorized employee, for example, can easily e-mail critical documents out of the company, the trade secret value found within that document is lost. Examples of electronic documents that a company may endeavor to protect include product design information, image or audio/visual files, or company operating information.

Referring now to FIG. 1, a schematic illustration of a conventional message scanning approach to document security is shown and indicated by the general reference character 100. In this "heuristic" approach, a scanning engine is used for scanning outgoing e-mail and scores may be given based on certain keywords within the message. As shown in FIG. 1, Message Sender 102 may have its e-mail scanned by Scanning Engine 104 prior to the message being passed through Domain Border 106 and onto Network 108. A problem with this approach is that it is not 100% accurate. The keywords chosen may be used in a benign fashion in a particular e-mail, for example. Or, the keywords may be avoided with malicious intent in a particular e-mail. Or, a threshold set for the scores associated with the scanning engine result may not properly flag messages of appropriate concern.

Referring now to FIG. 2, a schematic illustration of a conventional secured messaging approach to document security is shown and indicated by the general reference character 200. This approach uses "tokens" or other indicators applied to outgoing messages and parsed from incoming messages to determine if the message is an allowable communication. In FIG. 2, Message Sender 202-A sends/receives messages via Message Security 204-A on side "A" of the communication channel. Domain Border 206-A can separate Network 208 from side "A" of the channel. On side "B," Message Sender 202-B sends/receives messages via Message Security 204-B and the messages can pass through Domain Border 206-B to/from Network 208. A problem with the approach of FIG. 2 is that a compatible message security system must be found on each side of the communication. So, such secured messages cannot be sent to any computer or network component via Network 208. Rather, only those destinations fitted with a compatible message security system may receive the secured messages.

SUMMARY

In one embodiment, a technique for managing an electronic data representation includes storing first and second attributes in response to the creation of the electronic data representation by a user. The electronic data representation may be any type of digital asset, for example. The first and second attributes may be accessed in response to a message including the digital asset being sent by another or the same user. The message may be allowed to pass from a first domain to a second domain or the message may be maintained in the first domain in response to the first and second attributes. The first attributes may form an asset signature and may include an identifier and a digital watermark, for example. The second attributes may form an asset policy including distribution lists for sending and/or receiving the message, a content appropriate for sending field, and a time frame for allowable message sending, for example. The first domain may be a trusted domain and the second domain may be an open domain, for example.

Among other advantages, the technique allows for a cost-effective e-mail content security system configurable to be implemented on one side of a communication channel and without requiring the use of encryption.

These and other features of the present invention will be readily apparent to persons of ordinary skill in the art upon reading the entirety of this disclosure, which includes the accompanying drawings and claims.

DESCRIPTION OF THE DRAWINGS

FIG. 1 schematically illustrates a conventional message scanning approach to document security.

FIG. 2 schematically illustrates a conventional secured messaging approach to document security.

Figure 3:
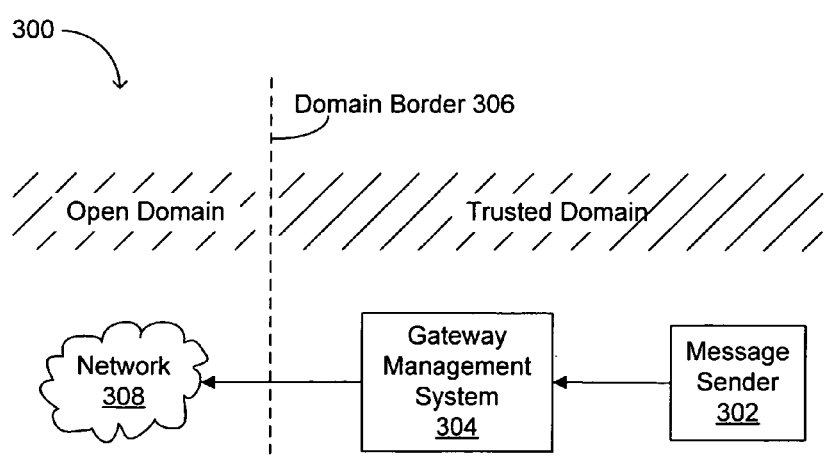
FIG. 3 illustrates a gateway management system arrangement in accordance with an embodiment of the invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described herein using example system arrangements and methods. In particular, applications to e-mail message sending of secure digital assets are exemplified. Further, policy and signature attributes are shown by way of example implementations. It should be understood, however, that the invention is not so limited and may be employed in conjunction with other policy and signature attributes, system arrangements and/or other variations for particular applications.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention allow for the management of an electronic data representation, which may be a digital asset, such as company trade secret information stored in electronic form. For example, embodiments of the invention may be employed to allow or restrict the transfer of a message having restricted content/attachment from a trusted domain to an open domain. As another example, embodiments of the invention may be employed to allow transferring or passing of the message based on signature attributes associated with the digital asset. As yet another example, embodiments of the invention may be employed in to allow passing of the message based on policy attributes associated with the digital asset. Signature and policy attributes are logically two different attributes, but may be in the same or separate data structure (e.g., file) depending on implementation. Further, embodiments of the invention may be employed to hold a restricted message in a quarantine storage, for example. Embodiments of the invention can allow for a cost-effective messaging system configurable to be implemented on one side of a communication channel and without requiring the use of encryption or the like. These examples will be more apparent in light of the description that follows. Note that the following examples are in the context of emails. It should be noted, however, that the present invention is not limited to e-mails. Embodiments of the present invention are applicable to other types of messaging such as HTTP downloads/uploads, FTP, instant messaging, and the like.

Referring now to FIG. 3, an illustration of a gateway management system arrangement in accordance with an embodiment of the invention is shown and indicated by the general reference character 300. Message Sender 302 can provide a message to Gateway Management System 304. If the message is allowed through Gateway Management System 304, the message can reach Network 308 via Domain Border 306. Domain Border 306 divides "trusted" domain from "open" or not-trusted domain. Examples of a trusted domain include a virtual private network (VPN), a corporate intranet, or even a relatively secure portion of a larger network. Examples of an open domain include any public network, such as the Internet.

The system of FIG. 3 is configurable to be implemented on only one side of a communication channel. Accordingly, no encryption and/or tokens are required in order to secure the outgoing messaging. As will be discussed in more detail below, Gateway Management System 304 can be implemented to use policy and/or signature attributes in order to determine whether a particular digital asset can be sent out of the trusted domain. Further, treatment of a message containing a digital asset deemed not allowed to leave the trusted domain due to policy and/or signature attributes, can include the quarantine of that message until proper notification is made within the trusted domain.

Figure 4:
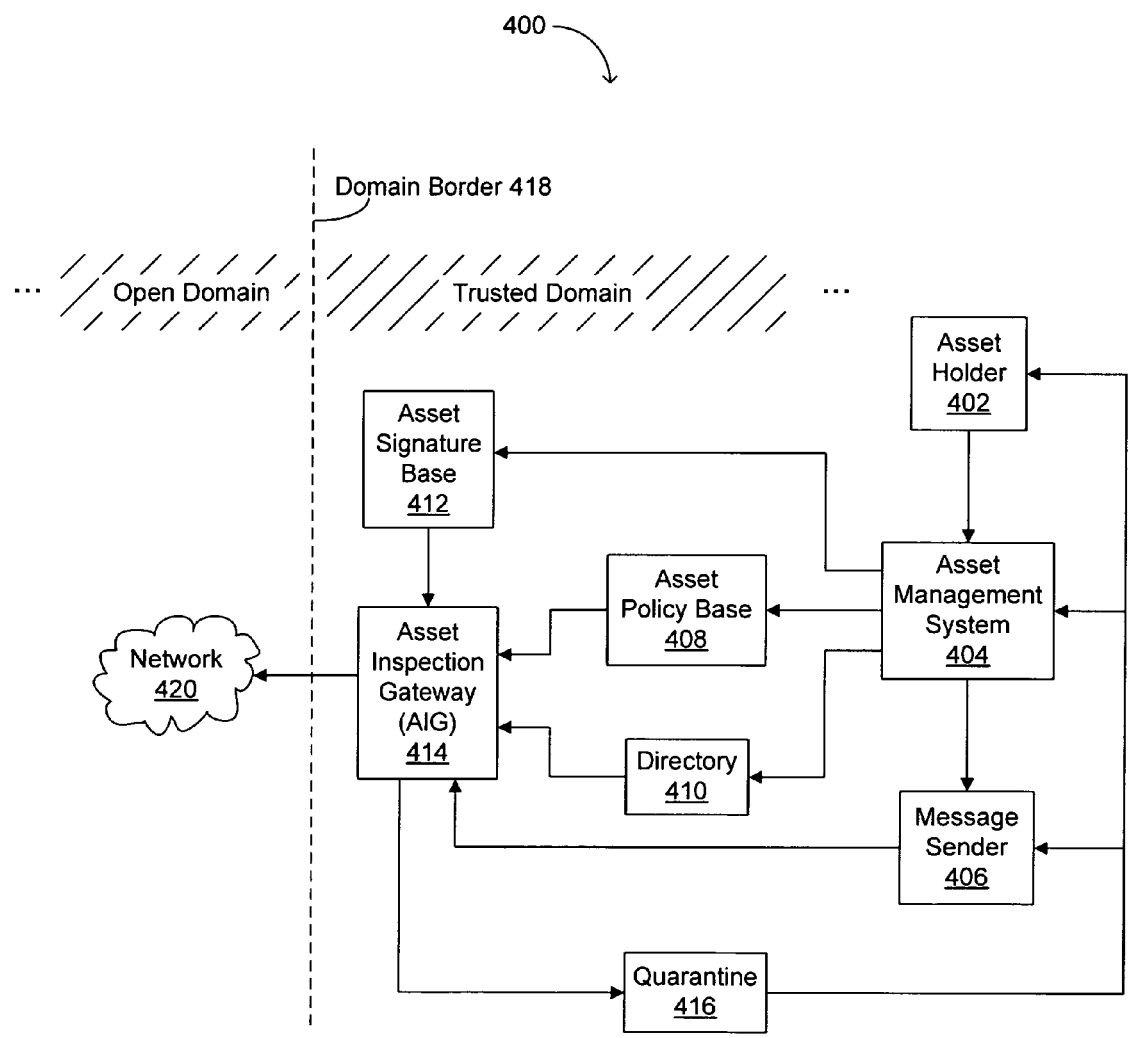
FIG. 4 schematically illustrates an example structure for a gateway management system in accordance with an embodiment of the invention.

Referring now to FIG. 4, a schematic illustration of an example structure for a gateway management system in accordance with an embodiment of the invention is shown and indicated by the general reference character 400. Domain Border 418 can separate Network 420 within the open domain from the trusted domain. The trusted domain may include a virtual private network (VPN), a corporate intranet, or even a relatively secure portion of a larger network. The open domain may include any public network, such as the Internet. Within the trusted domain, Asset Holder 402 can create and/or provide a digital asset to Asset Management System 404. As an example, Asset Holder 402 can be a user on a corporate intranet. The actual digital asset may be stored in any computer accessible over the network without detracting from the merits of the present invention. Asset Management System 404 can interface with Message Sender 406, Asset Policy Base 408, Directory 410, and Asset Signature Base 412.

Asset Management System 404 can provide to Asset Signature Base 412 attribute information associated with the digital asset. As will be discussed in more detail below, such signature attributes may include an identifier and a digital watermark (e.g., a "tag"), for example. Asset Management System 404 can also provide to Asset Policy Base 408 other attribute information associated with the digital asset. As will be discussed in more detail below, such policy attributes may include distribution lists for sending and/or receiving the message, a content appropriate for sending field, and a time frame for allowable message sending, for example.

Message Sender 406 can be a user who initiates the sending of a message that contains a digital asset. Message Sender 406 can be the same user or a different user than Asset Holder 402. Upon sending the message by Message Sender 406, the message can be received by Asset Inspection Gateway (AIG) 414. In addition, AIG 414 can interface with Asset Policy Base 408, Asset Signature Base 412, Directory 410, Quarantine 416 and, via Domain Border 418, Network 420. Note that the directions of the arrows shown in FIG. 4 and in other drawings illustrate an example data flow. In general, data flow may be bi-directional unless otherwise specifically noted.

For a message received by AIG 414 from Message Sender 406, Asset Signature Base 412 and Asset Policy Base 408 can be consulted to access the signature and the policy attributes, respectively, for each digital asset contained in the message. In one embodiment of the invention, both the signature and the policy attributes must be within specified thresholds for AIG 414 to send out the message. In other embodiments in accordance with the invention, either the signature or the policy attributes may be used by AIG 414 to determine whether to allow the message out of the trusted domain. In one embodiment, a signature attribute check result may be used to "gate" the policy attribute check (i.e., only check the policy attribute for documents "tagged" accordingly during the signature attribute check). In that and similar embodiments, the signature attributes serve as a tag to identify digital assets in messages.

Directory 410 may comprise a database storing user information and group information. For example, a policy for a particular digital asset may require a digital asset to be sent only by personnel from the Finance Department. If a person A tries to send that digital asset out, Asset Inspection Gateway 414 may query Directory 410 to verify if person A belongs to the Finance Department. Information about person A and the group (e.g., department) he or she belongs to may be stored in Directory 410. Directory 410 may be based on Lightweight Active Directory Protocol (LDAP), Active Directory or any other directory services.

As one example operation, a corporate intranet may be the trusted domain and a company employee may be attempting to send out classified or otherwise restricted intellectual property (IP) as an e-mail attachment. Asset Inspection Gateway (AIG) 414 can receive from Asset Signature Base 412 the signature attributes of the IP. In this example, the signature attributes may identify the e-mail content and/or attachment as company restricted IP. The digital watermark included as a signature attribute may also serve to authenticate the IP digital asset document. AIG 414 can also receive from Asset Policy Base 408 the policy attributes of the IP. For example, the policy attributes may indicate that the company employee attempting to send out the IP is not on the approved send distribution list for this IP. As another example, the content policy attribute may indicate that this document is not allowed to be sent out of the trusted network at all. As yet another example, the time frame policy attribute may indicate that a message containing the digital asset IP in question cannot be sent at this particular time because it is outside of the allowed time window for sending. In any of these situations, the signature and/or policy attributes, as determined by AIG 414 may not allow the message containing the restricted IP to leave the trusted domain.

For situations like the above example where the digital asset (e.g., company IP information) is not allowed to leave the trusted domain, the management system can hold the message in Quarantine 416. The quarantined message can be held in this state at least until Asset Holder 402, Asset Management System 404, and Message Sender 406 are all notified of the rejection of the message. For example, Asset Holder 402 may then want to re-create or edit in some fashion the IP in order to allow it to be sent out of the trusted domain. Or, Asset Holder 402 may want to enhance the policy attributes so as to further restrict attempts to send out the IP digital asset information. Asset Management System 404 may receive the information that the IP is the subject of a quarantine and act to disallow further attempts to send that IP out of the trusted domain until a proper reset or other override is received. For example, a company CEO may have sole authority to make such an override. Message Sender 406 may receive the information that the attempted message resulted in a quarantine operation and then act accordingly. If Message Sender 406 believes that the quarantine result was in error, Asset Holder 402 may be consulted in order to adjust the policy attributes for the IP to allow the IP to leave the trusted domain, for example.

In general, FIG. 4 shows one example implementation of a digital asset management system suitable for a wide variety of user as well as trusted domain applications. Signature and policy attributes can be enacted to establish rules that govern whether a particular digital asset (e.g., company IP information) is allowed out of the trusted domain by a given message sender. Based on the signature and policy attributes, a message containing a digital asset may either be allowed out of the trusted domain or the message may be quarantined within the trusted domain. Such a digital asset management system allows for a cost-effective e-mail content/attachment security system that can be implemented strictly within the trusted domain. Further, the signature and policy attributes associated with a digital asset can be adjusted to suit the needs of a particular implementation or domain application.

Figure 5A:
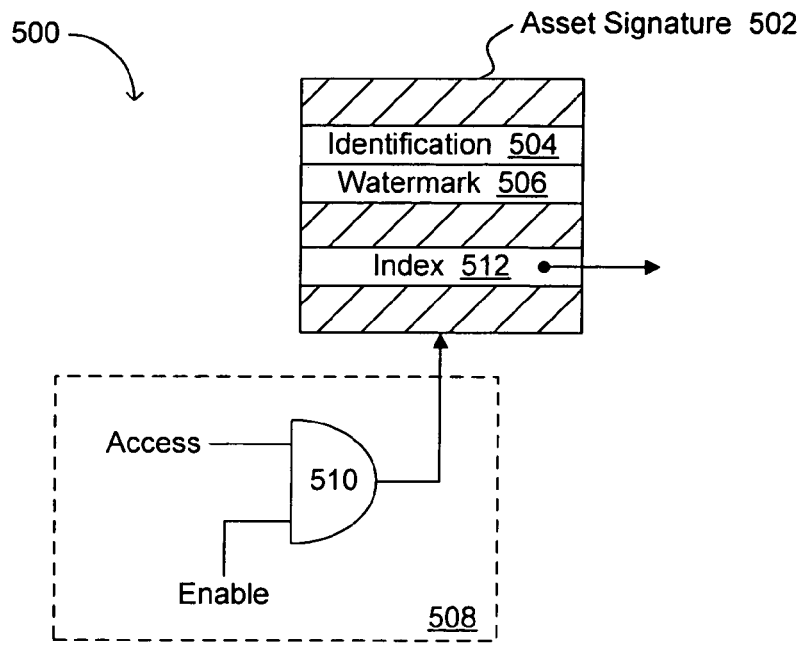
FIG. 5A illustrates an example asset signature data arrangement and access structure in accordance with an embodiment of the invention.

Referring now to FIG. 5A, an illustration of an example asset signature data arrangement and access structure in accordance with an embodiment of the invention is shown and indicated by the general reference character 500. An asset signature 502 may be used to identify digital assets in messages. Asset Signature 502 may include a number of attributes, which can be organized as fields, as shown in FIG. 5A. Identification 504 can be an identifier that is unique to the specific digital asset. Watermark 506 may be a digital watermark suitable for authentication for certain types of assets, such as images, video, or audio assets. A watermark is the preferred means of tagging digital assets as it does not visibly alter the asset. However, other means of tagging digital data may also be used in lieu of a watermark.

Asset Signature 502 may optionally be tamper resistant through the use of access control logic, for example. Such access control logic may be implemented in software or hardware. In one particular example implementation, access control logic 508 can include AND-gate operator 510 receiving Access and Enable signals. In this example, the signature attribute information of Asset Signature 502 cannot be accessed (e.g., Access='1') unless such accessing has been enabled (e.g., Enable='1'). In one example implementation, the "enable" control may be restricted to a higher level of employee (e.g., CEO or executive level) than the "access" control. Further, an Index 512 may include pointers to other databases or sources of information for the digital asset. In one embodiment, Index 512 includes a pointer to the location of the asset's policy attributes in Asset Policy Base 408. This allows Asset Inspection Gateway 414 to find an asset's policy attributes if the policy attributes are not included in the message.

Digital assets that are read-only or otherwise cannot be altered does not need to have an embedded asset signature. For those types of assets, a fingerprint of the asset may be taken at the time the asset is being inspected for transmission out of the trusted domain. The fingerprint may then be compared to those stored in a signature/fingerprint database to identify the digital asset. For example, when the digital asset arrives at Asset Inspection Gateway 414, Asset Inspection Gateway 414 may generate the asset's fingerprint in real-time using a conventional hash algorithm, such as Message Digest Algorithm #5 (MD5). Asset Inspection Gateway 414 may then query Asset Signature Base 412 using the fingerprint to get information about the digital asset.

In this fashion, signature attributes can be set up and controlled for each digital asset belonging to a particular organization or within a particular trusted-domain. Further, control of the access can be restricted so as to effectively make the signature attributes tamper resistant. Also, as another aspect of embodiments of the invention, the signature attributes may be embedded within the original asset. The signature attributes may also be rigidly used so as not to change the structure or functions of the digital asset and/or the signature attributes may be used in conjunction with the policy attributes in order to effect control over the dissemination of the digital asset information. Further, in one embodiment, the signature attributes may be used to effectively "index" the policy attributes via a bypass of the policy attribute check for certain digital assets (i.e., those deemed "safe" to disseminate).

Figure 5B:
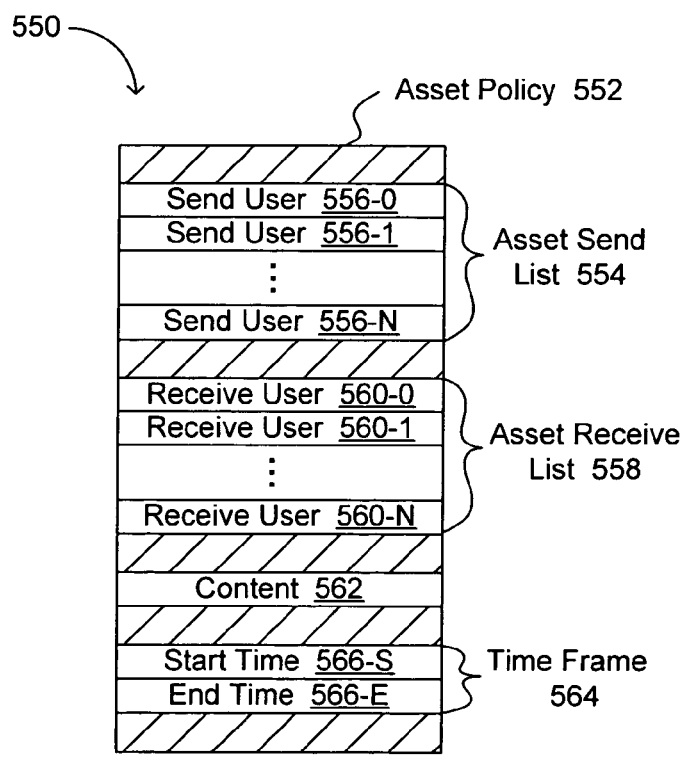
FIG. 5B illustrates an example asset policy data arrangement structure in accordance with an embodiment of the invention.

Referring now to FIG. 5B, an illustration of an example asset policy data arrangement structure in accordance with an embodiment of the invention is shown and indicated by the general reference character 550. Asset Policy 552, which can include all policy attribute information, can be organized as fields, as shown in FIG. 5B. Further, such policy attribute fields may be organized as higher level groupings, such as Asset Send List 554, Asset Receive List 558, and Time Frame 564. Asset Send List 554 may be a list of all users authorized to distribute or send a certain digital asset outside of the trusted domain. Asset Send List 554 can include Send User 556-0, Send User 556-1, and so on through Send User 556-N. For example, Asset Send List 554 may include only corporate executive level staff for a particular high-level digital asset in a corporation. As another example, Asset Sent List 554 may include engineering management in a corporation for product design information where the company is engaged in a collaborative product development project.

In addition, Asset Receive List 558 may be a list of all users authorized to receive or to see a certain digital asset. Asset Receive List 558 can include Receive User 560-0, Receive User 560-1, and so on through Receive User 560-N. Also, which content is allowable to be sent out of the trusted domain can be designated in Content 562. As one example, certain detailed product design information for an integrated circuit (IC) design company may not be allowed to leave a company at all until the product itself is nearing release. Accordingly, all such Content 562 attributes would indicate that this type of digital asset not be allowed to be sent out of the trusted domain (e.g., the company's intranet or other authorized network).

As another policy attribute included in Asset Policy 552, Time Frame 564 can restrict the time frame within which a digital asset may be allowed to be sent out of the trusted domain. Time Frame 564 can include the policy attributes Start Time 566-S and End Time 566-E so as to designate a specific time period within which the asset may be distributable outside of the trusted domain. For example, once a digital asset becomes several years old, in many cases this may mean that the value of the digital asset may decrease. As such, the allowable distribution time window encompassed by Start Time 566-S and End Time 566-E may be adjusted to allow distribution of the digital asset, at least with respect to the time frame policy attribute. The digital asset may still be restricted overall due to the other policy attributes, for example.

Accordingly, signature and/or policy attributes may be designated and controlled for each digital asset of concern. The signature and policy attributes may then be used by the asset manager to determine whether a particular digital asset must be quarantined or whether the digital asset can be allowed to be sent out of a trusted domain by the user attempting to send the information. Next, example operation flows of the digital asset manager according to embodiments of the invention will be discussed.

Figure 6:
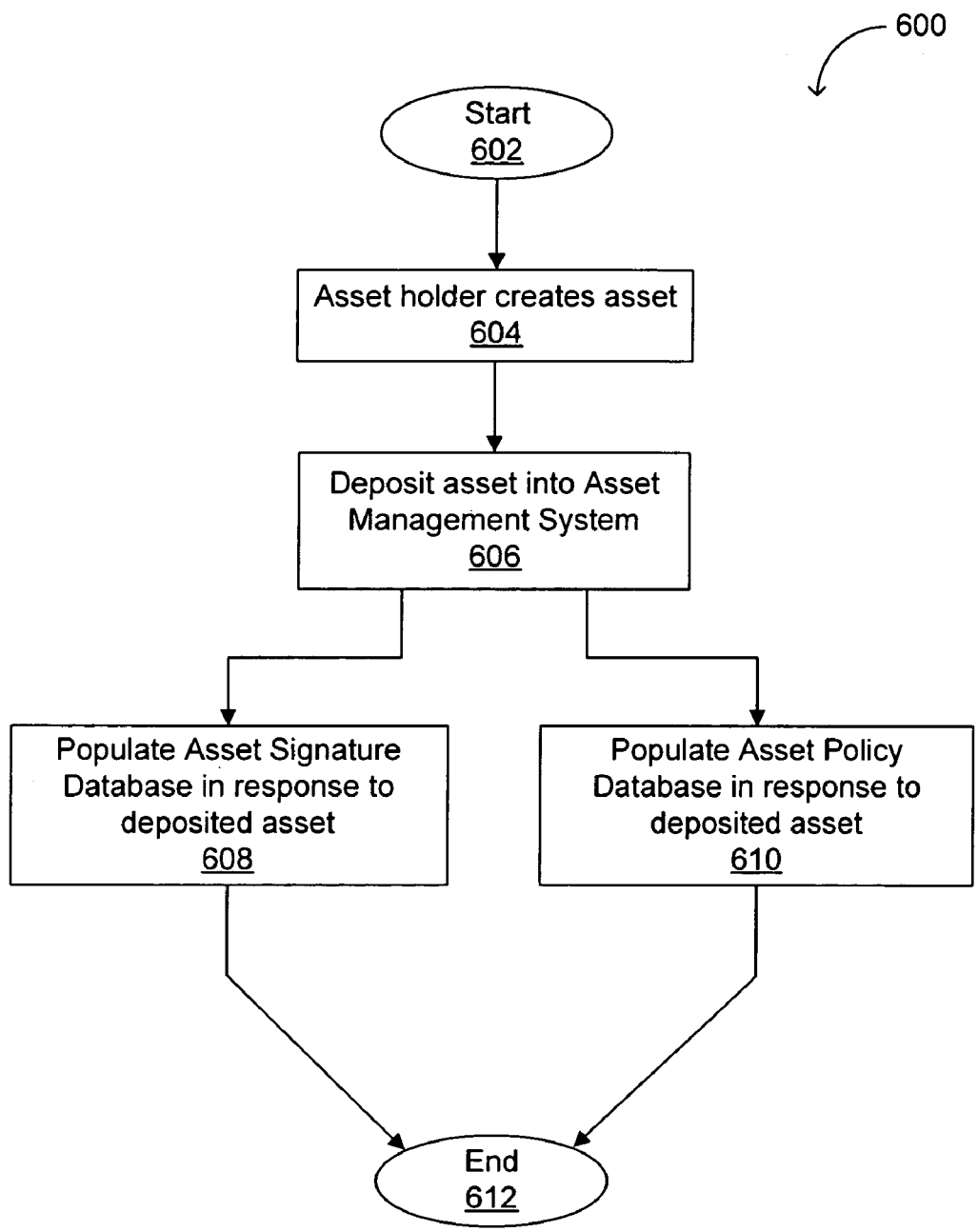
FIG. 6 shows a flow diagram of an example management of an asset creation in accordance with an embodiment of the invention.

Referring now to FIG. 6, a flow diagram of an example management of an asset creation in accordance with an embodiment of the invention is shown and indicated by the general reference character 600. The flow can begin in Start 602 and the asset holder can create a digital asset (604). The asset can be deposited into Asset Management System 404 (606). In response to the asset creation and/or deposition, Asset Management System 404 can direct Asset Signature Base 412 to populate the appropriate signature attributes (608) and Asset Policy Base (408) to populate the appropriate policy attributes (610). Of course, while the populating of the signature attributes (608) and the populating of the policy attributes (610) are shown in FIG. 6 to be parallel operations, one skilled in the art will recognize that these operations could be implemented alternatively in serial fashion. The example flow to populate policy and/or signature attributes can complete in End 612.

Figure 7:
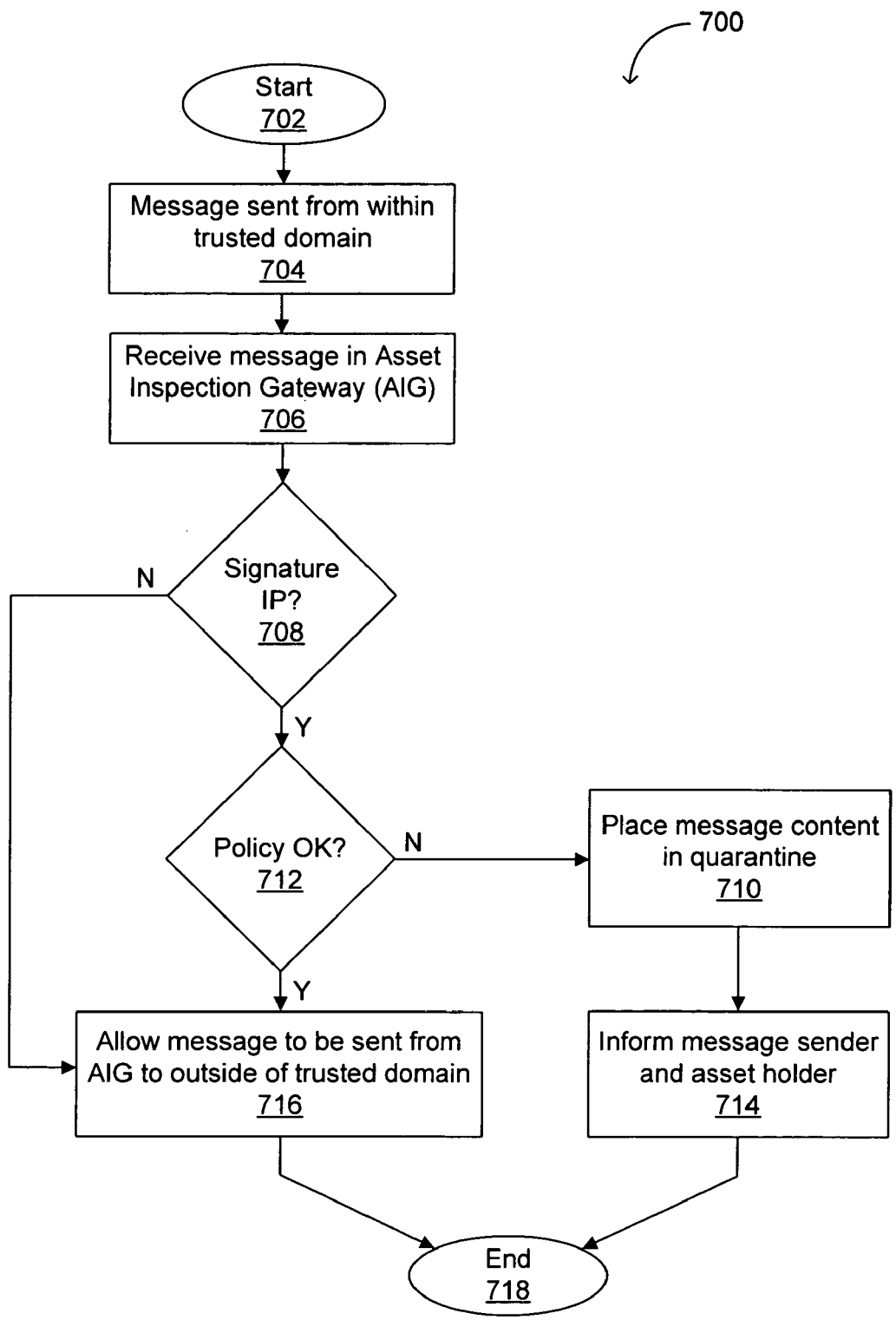
FIG. 7 shows a flow diagram of an example management of a message sending outside of the trusted domain in accordance with an embodiment of the invention.

Referring now to FIG. 7, a flow diagram of an example management of a message sending outside of the trusted domain in accordance with an embodiment of the invention is shown and indicated by the general reference character 700. The flow can begin in Start 702 and proceed to Message Sender 406 providing an e-mail message including a digital asset (704). The message can be received in Asset Inspection Gateway (AIG) 414 (706). AIG 414 can check signature attributes and, perhaps, also policy attributes to determine whether the digital asset can be allowed to be sent from the trusted domain by Message Sender 406. Decision box 708 can include a signature attribute check. For example, if the signature attributes indicate that the content and/or attachment of the message includes IP information that may be "tagged" as restricted, a further check of the policy attributes can be made (712). AIG 414 may use information from index 512 of the signature to retrieve the policy attributes of a digital asset from Asset Policy Base 408, for example. If the signature attributes indicate that the content and/or attachment of the message includes no digital asset (e.g., the message does not have a signature) or IP of particular concern, the message can be allowed to leave the trusted domain (716) and the flow can complete in End 718.

If the policy attributes are determined by AIG 414 to be acceptable (712), the message can be allowed to leave the trusted domain (716) and the flow can complete in End 718. If, however, the policy attributes are not found to be acceptable by AIG 414, the message can be placed in quarantine (710). If the message is quarantined, Message Sender 406 and Asset Holder 402, along with Asset Management System 404, can be informed (714) and the flow can complete in End 718. Of course, while decision boxes 708 and 712 are shown as parallel operations in FIG. 7, one skilled in the art will recognize that a serial implementation is contemplated as an alternative embodiment of the invention.

In this fashion, both the signature and the policy attributes can be accessed and checked by the digital asset manager (e.g., AIG 414) to determine whether a message including a digital asset can be allowed to leave a trusted domain or be retained within that trusted domain via quarantine. Alternatively, if the message contents show no particular concern via the signature attribute "tagging," the message can be allowed to leave the trusted domain.

In light of the present disclosure, it can be appreciated that the present invention may be generally employed to facilitate the protection and management of digital assets implemented in a wide variety of networks or applications. For example, embodiments of the present invention may be used to facilitate the management of a company's digital IP assets by retaining designated assets within the company's intranet.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of managing an electronic data representation, the method comprising:
   storing a first attribute for the electronic data representation in a first computer in a trusted domain, the electronic data representation being created by a first user in the trusted domain;
   accessing the first attribute in response to receiving an unencrypted e-mail having the electronic data representation as an attachment in a second computer different from the first computer, the e-mail being sent by a second user from within the same trusted domain as the first user; and
   checking the first attribute to determine if the e-mail containing the electronic data representation can be sent from the trusted domain and onto an open domain.

2. The method of claim 1 wherein the electronic data representation includes a digital asset.

3. The method of claim 1 wherein the first attribute includes an identifier.

4. The method of claim 1 wherein the first attribute includes a digital watermark.

5. The method of claim 1 wherein the first attribute is stored in an asset signature database.

6. The method of claim 1 wherein the first attribute includes a tamper resistant access control.

7. The method of claim 1 wherein a second attribute is stored in response to the creation of the electronic data representation, the second attribute being accessed in response to receiving the e-mail and checked to determine if the e-mail containing the electronic data representation can be sent from the trusted domain onto the open domain, the second attribute including a list of one or more users authorized to send the electronic data representation out of the trusted domain.

8. The method of claim 7 wherein the second attribute includes a list of one or more users authorized to receive the electronic data representation.

9. The method of claim 7 wherein the second attribute includes include an indication of allowable content.

10. The method of claim 7 wherein the second attribute includes time frame indications appropriate for sending of the electronic data representation.

11. The method of claim 1 wherein the trusted domain includes an intranet.

12. The method of claim 1 wherein the trusted domain includes a virtual private network (VPN).

13. The method of claim 1 wherein the open domain includes a public network.

14. The method of claim 1 wherein the e-mail is maintained in the trusted domain by placing the e-mail in a quarantine when the e-mail is not allowed to be sent out of the trusted domain with the electronic data representation.

15. A system for inspecting a message, the system comprising:

a gateway computer configured to receive from another computer first and second attributes associated with an electronic data representation created by a first user originating from a trusted domain and contained within an unencrypted e-mail sent by a second user in the same trusted domain, the gateway computer being further configured to pass the e-mail from the trusted domain to an open domain in response to a first indication based on the first and second attributes, the gateway computer being further configured to maintain the e-mail in the trusted domain in response to a second indication based on the first and second attributes.

16. The system of claim 15 wherein the gateway computer includes an asset inspection gateway.

17. The system of claim 15 wherein the electronic data representation includes a digital asset.

18. The system of claim 15 wherein the first attributes include an identifier.

19. The system of claim 15 wherein the first attributes include a digital watermark.

20. The system of claim 15 wherein the first attributes include a tamper resistant access control.

21. The system of claim 15 wherein the second attributes include a list of one or more users authorized to send the electronic data representation out of the trusted domain.

22. The system of claim 15 wherein the second attributes include a list of one or more users authorized to receive the electronic data representation.

23. The system of claim 15 wherein the second attributes include an indication of allowable content.

24. The system of claim 15 wherein the second attributes include time frame indications appropriate for sending of the electronic data representation.

25. The system of claim 15 wherein the trusted domain includes an intranet.

26. The system of claim 15 wherein the trusted domain includes a virtual private network (VPN).

27. The system of claim 15 wherein the open domain includes a public network.

28. The system of claim 15 further including a quarantine storage configured to maintain the message.

* * * * *